United States Patent
Baer et al.

(10) Patent No.: US 9,778,082 B2
(45) Date of Patent: Oct. 3, 2017

(54) METHOD AND DEVICE FOR DETERMINING THE VELOCITY OF A MEDIUM

(71) Applicant: KROHNE Messtechnik GmbH, Duisburg (DE)

(72) Inventors: Christoph Baer, Hattingen (DE); Thomas Musch, Bochum (DE); Stephan Neuburger, Stadeckenheim (DE); Michael Vogt, Bochum (DE); Timo Jaeschke, Hattingen (DE)

(73) Assignee: KROHNE Messtechnik GmbH, Duisburg (DE)

( * ) Notice: Subject to any disclaimer, the term of this patent is extended or adjusted under 35 U.S.C. 154(b) by 0 days.

(21) Appl. No.: 15/034,243

(22) PCT Filed: Nov. 4, 2014

(86) PCT No.: PCT/EP2014/073695
§ 371 (c)(1),
(2) Date: May 4, 2016

(87) PCT Pub. No.: WO2015/063323
PCT Pub. Date: May 7, 2015

(65) Prior Publication Data
US 2016/0273946 A1 Sep. 22, 2016

(30) Foreign Application Priority Data
Nov. 4, 2013 (DE) .......................... 10 2013 018 386

(51) Int. Cl.
*G01F 1/32* (2006.01)
*G01P 5/14* (2006.01)
*G01P 5/22* (2006.01)

(52) U.S. Cl.
CPC .............. *G01F 1/3209* (2013.01); *G01F 1/32* (2013.01); *G01F 1/3281* (2013.01); *G01P 5/14* (2013.01); *G01P 5/22* (2013.01)

(58) Field of Classification Search
CPC .......................................................... G01F 1/32
USPC ...................................................... 73/861.22
See application file for complete search history.

(56) References Cited

U.S. PATENT DOCUMENTS

| | | | |
|---|---|---|---|
| 4,708,021 A | 11/1987 | Braun et al. | |
| 5,121,658 A * | 6/1992 | Lew ......................... | G01F 1/10 73/195 |
| 7,712,380 B2 | 5/2010 | Xie | |
| 8,618,817 B2 | 12/2013 | Jakoby et al. | |
| 8,958,068 B2 | 2/2015 | Baer | |

(Continued)

FOREIGN PATENT DOCUMENTS

| | | |
|---|---|---|
| EP | 0 717 269 A2 | 6/1996 |
| EP | 2 559 973 A1 | 2/2013 |
| GB | 1 541 419 | 2/1979 |

*Primary Examiner* — Jewel V Thompson
(74) *Attorney, Agent, or Firm* — David S. Safran (57) ABSTRACT

A method and device for determining a velocity of a flowing medium that allows an as high as possible measuring accuracy without requiring a complicated measuring construction is achieved in that a vortex is generated in the medium and an electromagnetic signal is emitted into the medium. Then, the permittivity of the medium is determined and the velocity of the medium is determined using the permittivity measurement.

9 Claims, 3 Drawing Sheets

(56) References Cited

U.S. PATENT DOCUMENTS 9,243,939 B2    1/2016   Tanoura et al.
2013/0041599 A1    2/2013   Rick \* cited by examiner

METHOD AND DEVICE FOR DETERMINING THE VELOCITY OF A MEDIUM

BACKGROUND OF THE INVENTION

Field of the Invention

The invention relates to a method for determining at least the velocity of a flowing medium. Furthermore, the invention relates to a device for determining at least the velocity of a medium flowing through a pipe. The medium is, thereby, preferably at least partially gaseous, i.e., for example, a gas-dust-mixture.

Description of Related Art

In modern processing systems, it is often necessary to monitor or to quantitatively evaluate the flow or flowing of a medium through a pipe, i.e., for example, a pipeline or piping arrangement. For this, measuring devices are known for determining the volume or mass flow, which implement the vortex-, Coriolis-, ultrasound- or float-principle for the respective measurement.

A device for determining the velocity of a flowing medium is disclosed, for example, in the German Patent DE 35 04 622 C2 and corresponding U.S. Pat. No. 4,708,021. Two sensors are thereby arranged shifted to one another along a pipe conveying the medium. The sensors or the measuring principles implemented with them lead to the signals obtained by the sensors being independent of inhomogeneities of the flowing medium. The velocity of the inhomogeneities, and thus, the medium is deter- mined using a cross-correlation of the signals. Details for the practical implementation, however, are not described. Furthermore, the construction with two sensors arranged shifted to one another is complicated and also requires a correspondingly large amount of space around the measuring arrangement.

European Patent Application EP 2 559 973 A1 and corresponding U.S. Pat. No. 9,243,939 B2 describe a construction for determining the velocity of a medium in a pipe by means of laser beams that vertically cross the pipe. Vortices are thereby generated in the medium, in order to determine the velocity from the noise in the received laser signals.

In a similar construction according to U.S. Patent Application Publication 2013/0041599 A1, vortices are also generated and microwave signals are used.

SUMMARY OF THE INVENTION

Thus, the object of the invention is to provide a method for determining the velocity of a flowing medium—and a corresponding device—, which allows an as high as possible measuring accuracy without requiring a complicated measuring construction.

The method according to the invention, in which the above derived and described object is achieved, is initially and essentially characterized in that at least one vortex is generated in the medium, that several electromagnetic signals are emitted as query signals into the medium essentially perpendicular to a direction of flow of the medium, that several electromagnetic signals are received as response signals, that the phases of the response signals are determined in relation to the query signals, that a measure for the permittivity of the medium is determined at least from the phases, and that the velocity of the medium is determined from the determined measure.

In each case, the phase is determined between the response signal and the associated query signal, which is received as response signal.

In one implementation, the query signal is, in particular, a microwave signal.

Vortices are generated in the flowing medium for the measurement. Such vortices can be generated, for example, by a change in the diameter of the pipe, through which the medium flows. For example, a constriction in the pipe is thus provided. Vortices are, however, for example, also generated by at least one rough section of the inside of the pipe facing the medium. In a further implementation, the vortices are generated by a blower.

Additionally or alternatively, vortices are generated as a consequence of events in the processing system itself or, respectively due to a process that affects the medium. This, for example, could be a pumping process.

Thus, the vortices, in one variation, are generated using special devices or arrangements. In an alternative or additional variation, the vortices result due to special features in the application environment in which the method is carried out and are accordingly exploited for the measurement.

If the vortices are generated in a manner that can be actively controlled—for example, using a blower—, then, in one implementation, this allows an influencing of the measurements by means of controlling vortex generation.

In order to measure the velocity—in particular in the direction of flow of the medium behind the site responsible for vortex generation—electromagnetic signals as query signals are emitted into the medium and response signals, which are also electromagnetic signals, are received.

Preferably, the query signal is first emitted after the generation of at least one vortex, in order to determine the present velocity of the medium.

For calibration, in one implementation, the query signal is emitted without generating the vortex or before generating the vortex.

Based on the response signals, a measure of the permittivity of the medium is determined, in particular using stored formulas or algorithms or in conjunction with stored data sets, which possibly also take particular characteristics of the medium or the type of vortex generation or the measuring construction in general into account.

The permittivity—alternative designations being dielectric conductivity or dielectric function—describes the permeability of a medium for electric fields. The relative permittivity—also called dielectric permittivity or dielectric constant—is the ratio between the permittivity of a medium and that of a vacuum. In general, the effects of a medium weakening the electric field are generally described by the permittivity.

The determined permittivity is, thereby, in particular, an effective permittivity, which results overall from the interaction of the emitted query signal with the medium and under the influence of the present vortex.

According to the invention, a measure for the permittivity of the flowing medium in the volume section with electromagnetic signals running through it is determined based on the response signals and, preferably also based on the query signals.

Using this measure as a basis, the velocity of the medium is then determined. Stored data, value pairs, formulas or algorithms are possibly used for this.

In the sense of evaluation, the determination of the measure of permittivity and of the velocity of the medium can, thereby, be carried out in one step and, in an alternative implementation, in several individual steps.

Described in other words, the method according to the invention is a method for velocity measurement of gases or gas-dust-mixtures or other essentially compressible media, which possibly also have inclusions—e.g., as solids. Vortices in the medium are thereby used for the measurement. In one implementation, measurement involves the vortices passing at least a type of radar gate and the effect of the flowing medium or the flowing vortex on the electromagnetic signal being evaluated. Depending on the dimensioning of the pipe conveying the medium or the type of vortex generation, several such radar gates can possibly be implemented, which are arranged differently or allow different signal paths.

For evaluation, in particular the phase change is determined, which is set in the response signal due to the pressure differences of the vortex in the medium. In one implementation, this is supplemented by the measurement of the transit time of the electromagnetic signals. The determination of the transit time is necessary, in particular, when the phase of the electromagnetic signals changes by more than 360° due to the vortices or the pressure differences.

In one implementation, several response signals are received or query signals are emitted so that a pressure sequence in the flowing medium is determined. Thereby, the phase changes are evaluated in view of temporal development caused by the medium and are statistically evaluated—in particular by determining the standard deviation. The velocity of the medium can then be determined using these determined values by means of model construction.

Due to the vortices, pressure differences in the—preferably mainly compressible—medium result, which are expressed by the change of the permittivity of the flowing medium, and thus, can be determined by measurement with the electromagnetic signals—in particular with microwave signals.

A model is used in order to determine the velocity of the medium, in particular in one implementation. The form of the pipe or the characteristics of the vortex in the medium are taken into account for the generation of such a model.

The Rankine model or the Lamb-Oseen model, for example, can be used for describing the vortex carried away by the flow of the medium.

If, for example, the pressure distribution p is of interest, then the pressure distribution is given in dependence on the vortex core radius $r_0$, the surrounding pressure $p_u$, the density $\rho$, the velocity of the vortex $v_0$ and the distance from the center of the vortex r as follows:

$$p = p_u - \rho * v_0^2/2 * r_0^2/r^2.$$

In the vortex core, a negative pressure is clearly generated relative to the environment, which increases both with the size of the vortex as well as with the velocity of the incident flow. This results from the gas molecules being pushed outwardly due to a circular movement of the vortices. In view of electromagnetism, this negative pressure—caused due to the decreased number of polarizable molecules—can be described with a reduced electric permittivity. The reduction associated therewith of the electric susceptibility results approximately linearly with the decrease in pressure. Vortex movement within a pipe can thus be interpreted as a moving permittivity distribution.

In particular, in the case of gas vortices, it is to be assumed that stronger gas vortices, i.e., higher rotation velocities of the vortex, lead to lower pressure in the vortex core. This effect is then seen in the standard deviation of the value of the measured phase differences. The temporal variation of the phases allow for further conclusions about the flow of gas, since generated vortices are carried away more quickly at higher flow velocities. Here, model generation of the part of the pipe in consideration has to link the detection rate of the vortex with the flow velocity.

If several measured values are used as parameters in model generation, then the dependency on further variables—e.g., type of respective gases or fluctuation of the concentration of the gases—is avoided.

In one implementation, the Reynold's number Re is used for the observation of gas flow for model generation, the Reynold's number resulting from the average velocity v, the diameter d of the pipe conveying the medium and the viscosity $$v: Re = v * d/v.$$

A transition section between a laminar and a turbulent flow is given by a Reynold's number greater than 2300. Since gases have a low viscosity (e.g., air 17.1 µPa·s), approximately all gas flows in pipes are to be seen as turbulent.

With the help of the so-called Reynold's decomposition, the flow can be described by an ensemble average value at a location—i.e., for example, an average value that is moved along with the flow—as well as by a statistical fault value, which is dependent on place and time.

The method according to the invention is based on the knowledge that the pressure profile of a vortex cross section has a negative pressure in the center of the vortex, which, when passing a radar gate, causes a measurable change in the electromagnetic signal of the radar gate due to the accompanying change of permittivity.

It has been seen, thereby, that in the area of the vortex and, in succession, the associated different pressure zones of the medium, phase changes of a few degrees can arise with the emitted electromagnetic signals. Thus, according to the invention, the vortices within the pipe are detected with the help of the determined phase shifts. Using a continual and sufficiently fast measurement, the flow can additionally be sampled and the occurrence of the vortex in the temporal sequence can be reconstructed therefrom.

The standard deviation of the phase change is, in particular, a measure for the strength of the occurring vortex, wherein the temporal fluctuations of the determined phase changes caused by the vortices in the flowing medium provide information about the occurrence and shedding of the vortex at the location, at which the vortex is generated—e.g., due to a constriction of the pipe or due to a rough spot, etc. Both variables can be indicative of the average flow velocity using model generation. The standard deviation is then used as a measure for the velocity of the vortex, and moreover, as a measure of the velocity of the medium.

In a supplementary implementation, at least the time between emitting the query signal and receiving the response signal is determined. In this implementation, the transit time of the electromagnetic signal is thus determined in order to be used for the determination of the velocity of the medium.

If several signals are emitted as query signals and received as response signals, then this also allows for an evaluation of the temporal behavior of the measure for the permittivity or, respectively, the determination of the velocity of the medium therefrom. Additionally or alternatively, a spatial distribution of the vortices or the pressure fluctuations in the medium can be monitored or determined.

The vortices are thereby, as has been seen, generally distributed statistically over the cross section of the pipe.

The query signals are preferably modulated so that the—here, in particular, after being reflected at a reflector—signals traveling to the receiving device and received as response signal allow, in particular, the following conclusions: First, different reflection points should be separable from one another. This allows the separation of the reflection that contains the indirect velocity information of the medium from possible moving interfering reflections (for example, vibrating windows in the pipe). Furthermore, for each reflection, the distance (optimally as precise phase information) and the amplitude should be known. Additionally, the type of modulation should allow a quick measurement and the collection of information from amplitude and distance in dependence on time. Finally, the modulation should allow Doppler-invariant measurements.

Modulations suitable for this are, for example, FMCW radar (frequency modulated continuous wave radar) or LFM-FSK (a combination of LFMCW, i.e., linear frequency modulated FMCW and FSK modulation as frequency sampling or frequency shift keying).

The emitting or receiving of the plurality of query or response signals is thereby carried out essentially simultaneously or time-shifted to one another. Thereby, the time shift, e.g., for emitting the query signal in dependence on the type of emitted signal can be as short as required in order to obtain a high as possible sampling of information about the medium or especially about the vortices in the medium and, thus, about the velocity sequence.

Signal evaluation, in one implementation, is composed of two methods, whose results are combined in order to reduce measurement errors.

The phase between query and response signal with a distance R covered by the query signal depends on the propagation characteristics of the medium found in the antenna beam. The determined phase change of a virtual distance R' occurs when the vortex essentially passes through the convolution of the field distribution function of the emitted signal with the permittivity distribution of the medium or the vortex. Using the known field distribution of the emitted signal, the pressure sequence of the vortex can be reconstructed e.g., by means of a deconvolution operation. Thus, the core pressure of the vortex can be extracted from the measurement. This can indicate the vortex expansion. Thus, using the detectable points in time of input and output through the antenna beam together with the known spatial expansion of the vortex core, the velocity of the vortex and thus that of the medium can, in turn, be calculated. The crossing of electromagnetic signals through the flowing vortex thus leads to a virtual change of distance of the reference target or, in the case of a reflector, to its virtual shift.

This method is combined with a second method, which takes the stochastic occurrence of the individual vortex into account. Overall, this is based on an autocovariance analysis of the flowing medium. The signal from this virtual radar target thus contains indirect information about the flow velocity of the flowing medium.

In one implementation, the query signals are emitted in different spatial directions and/or response signals are received from different spatial directions. In one implementation, the spatial directions thereby relate to the same volume of the pipe conveying the flowing medium. In an alternative implementation, they relate to at least partially differing volumes of the pipe conveying the flowing medium.

Thereby, in one variation, a type of tomography is carried out in order to obtain more information about the vortices in the medium.

In one implementation, a marking gas is added to the medium. The marking gas is added, in particular, in the direction of flow, before the volume section that is passed by the query signal. The marking gas is, thereby, particularly characterized in that it is easier for the measuring construction to measure than the actual medium. Thus, in one implementation, a medium to be measured having a low permittivity has a marking gas added with a higher permittivity—the permittivity of the marking gas is thus greater than that of the medium to be measured. The medium consequently conveys the marking gas with it. Reciprocally, the marking gas improves the measurement or, possibly even makes it possible. An example of a marking gas is carbon dioxide. The choice of marking gas is, however, dependent on the medium to be measured.

The above derived and described object is achieved according to a further teaching of the invention with the device mentioned in the introduction in that at least one vortex generator is provided and which is designed to generate at least one vortex in the medium, that at least one emitting device is provided, designed to emit electromagnetic signals as query signals into a volume of the pipe conveying the medium, that at least one receiving device is provided, designed to receive electromagnetic signals as response signals from a volume of the pipe conveying the medium, that at least one evaluating device is provided, designed to evaluate the response signals, that at least one data storage is provided, designed to store functional correlations and/or value tables and/or formulas and/or algorithms and/or mathematical models, and that the evaluating device determines at least the phase of the response signals in relation to the query signal and determines the velocity of the medium based on the determined phases and based on at least one piece of information stored in the data storage.

The vortex generator, depending on the design, is an element or a section or a component in at least one of the sections of the pipe—in particular, a pipeline—for conveying the medium and, in another design, is a device interacting with the pipe or with the medium being conveyed in it.

In one design, the vortex generator is a section with a diameter constriction and, in an alternative design, a section with a diameter increase in relation to the preceding or following sections of the pipe.

In an additional or alternative design, the forming of vortices is caused by a section of the inner wall of the pipe that has a different roughness than the other sections of the pipe.

In an additional design, the vortex generator is, at least partially, a type of blower. Such an exemplary vortex generator can, thereby, be actively controlled, in one design, in respect to the formation of vortices—e.g., in respect to their rate of occurrence, strength, temporal spacing, etc.

In one design, a marking gas flows through a blower or other inlet into the pipe and, thus, into the flowing medium.

Furthermore, in one design, the vortex generator is used primarily for forming vortices, and in an alternative design, has other tasks. Thus, the vortices, in one design, for example, result due to a correspondingly timed pump, whose purpose is conveying the medium, i.e., to make it flow.

Furthermore, at least one emitting device is provided for emitting at least one electromagnetic signal as query signal into a volume of the pipe conveying the medium. The emitting device is, in particular in one design, an antenna for emitting electromagnetic signals in the microwave range, as is used by level meters operating according to the radar principle.

Additionally, at least one receiving device is provided for receiving at least one electromagnetic signal as response signal from a volume of the pipe conveying the medium. The receiving device is also preferably an antenna.

In one design, the emitting device and the receiving device are identical.

In a further design, the volumes, into which the query signal is emitted and out of which the response signal is received, are identical, and in an alternative design, they are at least partially or completely different.

Finally, for determining the velocity of the flowing medium, at least one evaluating unit is provided for evaluating at least the response signal.

For designing the device for determining the velocity and also the type of evaluation or generation of the response signal or signals etc., the above explanations in respect to the method also hold true or, vice versa, the explanations and implementations in view of the device can be carried over to the method.

The device is, thereby, in particular, also used in implementing the above method for determining the velocity of the medium.

In order to design the construction as compactly as possible, one design comprises at least one reflector device—having reflecting characteristics for the relevant electromagnetic signals—being provided. Thereby, it is further provided that the emitting device emits the query signal in—at least or essentially only—the direction of the reflector device. Additionally or alternatively, the receiving device receives the response signal from—at least or essentially only—the direction of the reflector device.

The transit path between the emitting and the receiving devices is extended by such a reflector device, without having to increase the size of the measuring construction.

In one design, the reflector device is designed so that it influences the polarization of the electromagnetic signals reflected on it.

Both active as well as passive reflector devices with the characteristic of affecting the polarization are disclosed in the published German Patent Application DE 10 2011 102 991 A1 and corresponding U.S. Pat. No. 8,958,068 B2. At least one reflector device described there is used in this design of the device for determining the velocity of the flowing medium.

By influencing the polarization, the reflected signals are characterized, and, thus, can be more easily differentiated from the other received electromagnetic signals.

In one design, the evaluating unit is designed so that it determines the phase of the response signal—relative to the query signal—and at least the time between emitting the query signal and receiving the response signal. As already described above in respect to the method, in order to determine the velocity, at least the phase is determined, as an effect of the flowing medium on the electromagnetic signals or on the transit time, from the response signal or from several response signals and is used for evaluating or determining the velocity. Therefore, the evaluating unit is designed accordingly.

Additionally, at least one data storage unit is provided for determining the velocity of the medium.

Thereby, in one design, the data storage unit is an integral component of the device, and in an alternative design, is an external unit that is connected, in particular, to the evaluating unit via a corresponding data communication connection.

The data storage unit is used for storing functional correlations and/or value tables and/or formulas and/or algorithms and/or mathematical models for evaluating the at least one response signal or the response signals or the data and information obtained therefrom.

Furthermore, the evaluating unit determines the phases relative to the associated query signals from several response signals.

From the determined phases, the evaluating unit, in one design, then determines at least one standard deviation, in order to determine the velocity of the medium based on the determined standard deviation and based on at least one piece of information relating to the standard deviation stored in the data storage.

The data or information in the data storage describes, here, the correlation between the velocity of the medium, the vortex, the permittivity or, respectively, the effects of the vortex on the query signal, and thus, its effects on the response signals. In particular, the correlation between the standard deviation of the phases and the velocity of the medium is illustrated.

Data for this are, e.g., value tables, calculation formulas or algorithms, which allow the conclusion from the standard deviation of the phases to the velocity or to the (in particular effective) permittivity of the medium in the volume portion of the medium passed by the response signal.

Additionally or alternatively, a correlation of the sent or received signals is carried out by the evaluating device.

At least two emitting devices and/or at least two receiving devices and/or at least two reflecting devices are provided in one design.

In an additional or alternative design, at least one emitting device and/or one receiving device and/or one reflecting device is/are movably designed.

By using several emitting or receiving or reflecting devices or due to their movable design, different signal paths for the electromagnetic signals used for measurement can also be exploited.

In detail, there is a plurality of possibilities for designing and further developing the method and device according to the invention as will be apparent from the following description of embodiments in conjunction with the drawings

DETAILED DESCRIPTION OF THE INVENTION

Figure 1:
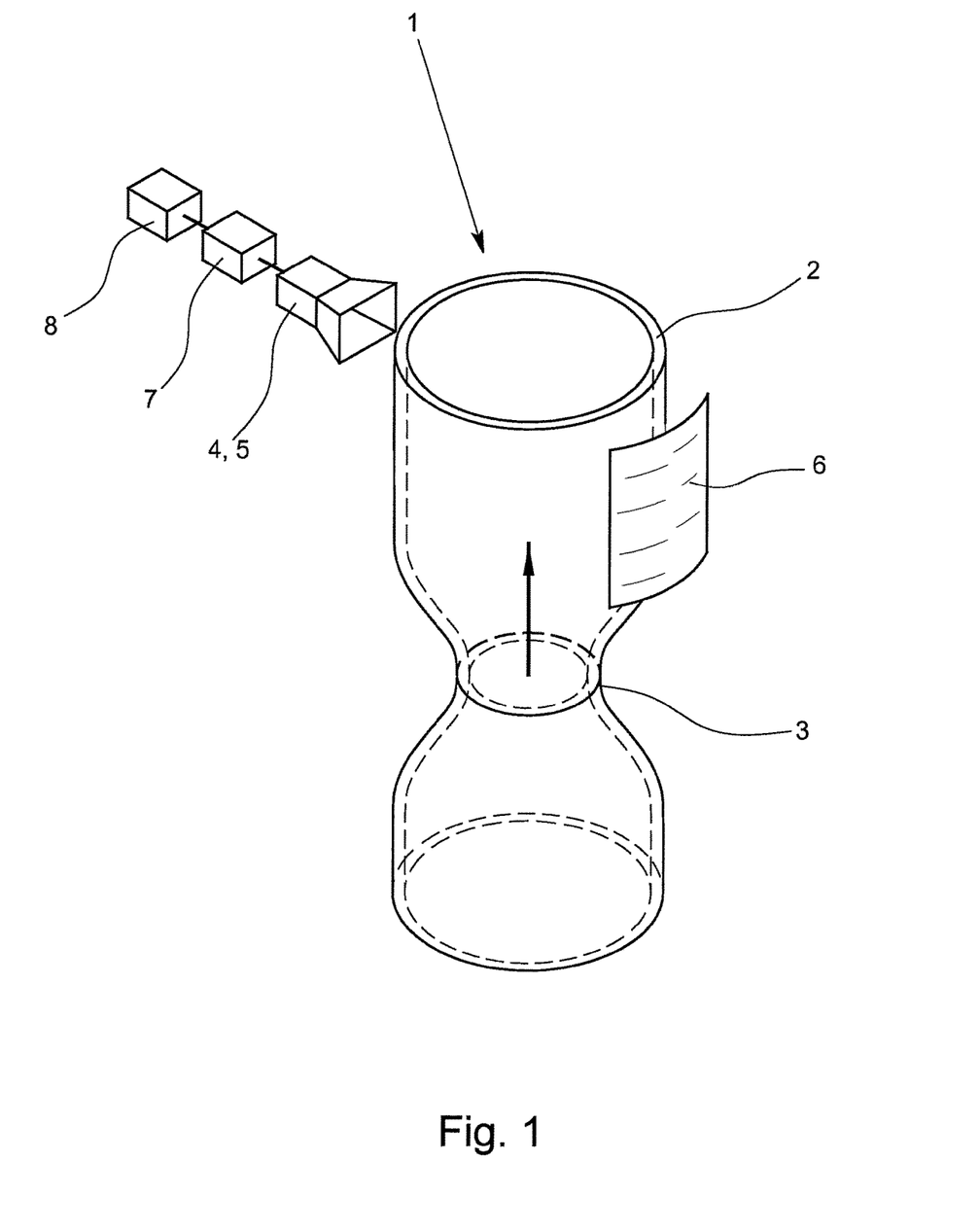
FIG. 1 is a schematic perspective view of a device for measuring the velocity of a medium.

In FIG. 1, a device 1 is schematically shown for measuring the velocity of a compressible medium. The medium is conveyed in a pipe 2—e.g., a pipeline—and moves from bottom to top—as indicated by the arrow—in the illustrated embodiment.

A vortex generator 3 is present before the actual measuring site, which, here, is a constriction of the diameter of the pipe 2, through which vortices are generated in the medium.

In the illustrated embodiment, the constriction is rotationally symmetric, being designed as a complete constriction of the cross section of the pipe 2.

In an alternative embodiment—not shown—a flat area is provided only in an angle section of the cylindrical pipe 2. In a further—also not shown—variation, two flat areas are provided opposing one another in a plane perpendicular to the longitudinal axis of the pipe 2.

The vortices can thereby be understood as pressure fluctuations having a pressure profile in the flowing, in particular at least partially gaseous, medium. Thereby, the gas pressure is described as a volume portion of gas molecules in a vacuum for the evaluation.

Thus, in particular, the effective permittivity is determined, wherein the permittivity of the flowing medium is inhomogeneous due to the vortices and their pressure fluctuations and is dependent on whether the section is with or without vortices.

An emitting device 4 is provided for determining the permittivity, which, in the illustrated embodiment, is simultaneously used as receiving device 5. The emitting device 4 emits electromagnetic signals as query signals into the volume of the pipe 2 that conveys the medium.

In the illustrated variation, the query signals are emitted in the direction of a reflector device 6 into the medium, which reflects the electromagnetic signals again in the direction of the receiving device 5. This allows a very compact and simple measuring construction. In particular, wiring or electrical contact is to be provided only on one side of the pipe 2.

The receiving device 5 receives an electromagnetic signal as a response signal, which, from at least the query signal, results in the interaction with the medium and the reflection at the reflector device 6.

The emitted and received electromagnetic signals are located, in particular, in the microwave range.

Overall, the emitting 4, receiving 5 and reflector devices 6 can be described as components of a radar gate, which the medium and, in particular, the vortices in the medium pass.

The reflector device 6 affects, here, in particular, the polarization of the reflected signal, and thus, causes a characterization of the actual signal of interest as opposed to possible interfering signals, which are also received by the receiving device 5.

The emitting 4 and receiving devices 5 are further connected to an evaluating device 7, which, in particular, is used for evaluating the response signals received by the receiving device 5.

The phase relative to the respective query signal is determined from the response signals in the evaluating device 7. Furthermore, the transit time is determined as the time between the emitting of the query signal and the receiving of the associated response signal.

A measure is determined from this for the permittivity of the medium in order to, then, come to the velocity of the medium based on data stored in the data storage 8.

Overall, the method for measuring the velocity in a medium that is at least partially gaseous—e.g., in the form of a gas-dust-mixture with solid body particles as inclusions—consists of the medium provided with vortices—from a vortex generator 3—passing at least one radar gate, which is made up of emitter 4, receiver 5 and reflecting device 6 here.

From at least one electromagnetic signal that passes through the medium, the velocity of the medium is concluded from determining the, in particular, local—i.e., assigned to a section of at least one vortex—permittivity of the medium.

Measurement via emitting and receiving of electromagnetic signals is, thereby, preferably carried out at a quick tempo, which is possible, in particular, by using accordingly high-frequency signals as query signals.

The mechanical construction for measurement is limited to one side of the pipe 2 due to the use of the reflector device 6.

Figure 2:
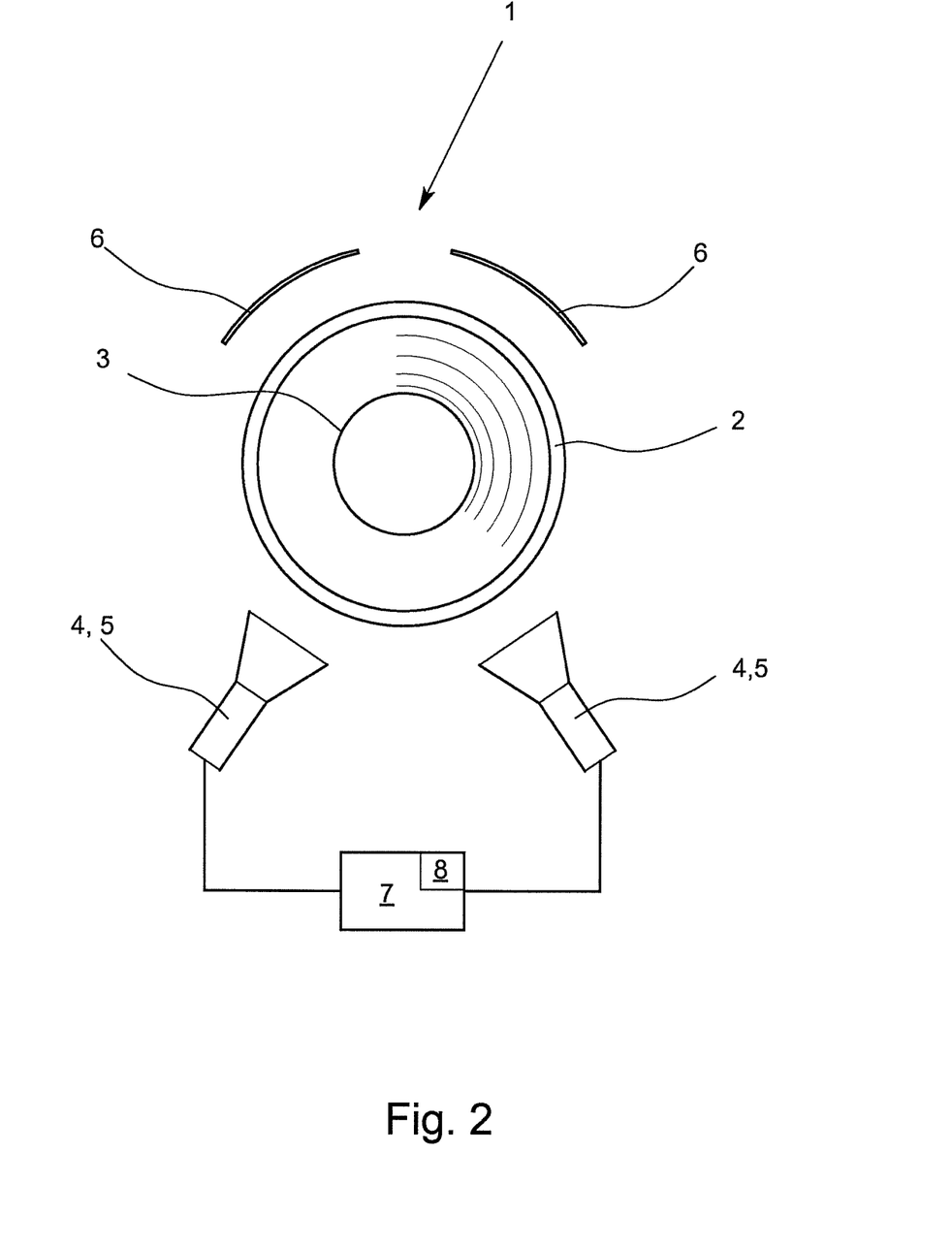
FIG. 2 is a top view of an alternative construction for velocity measurement.

In order to obtain more information about the medium or to increase the measuring accuracy, FIG. 2 shows an embodiment with a tomographic measuring arrangement, which allows for the implementation of simultaneous measurement in two different spatial directions or two radar gates.

For this, two emitting devices 4, two receiving devices 5 and respectively assigned reflector devices 6 are arranged at different locations around the pipe 2.

A constriction 3 can be seen in the middle of the pipe 2, as is also used in the FIG. 1 embodiment, as a vortex generator 3 which, however, can be variably switched, and in particular, controlled.

For this, in one variation, the respective section of the pipe 2 is designed with an elastic material that can be controllably constricted. Alternatively, the vortex generator 3 is a panel that protrudes into the pipe 2 and whose inner diameter is accordingly adjustable. If the construction is replaced by a blower, for example, then, in particular, the strength, size or frequency of the vortex can also be adjusted and, when necessary, optimized.

The evaluating device 7 evaluates the response signals from both receiving devices 5 in conjunction with the date storage 8.

Thereby, the measuring construction allows, in particular, an evaluation of the response signals using a cross-correlation and a evaluation of the respective correlation coefficients.

In one measuring sequence, the individual emitting 4 and receiving devices 5 are operated differently with one another, so that alternative signal paths via the two reflector devices 6 can be used for the measurement. In this manner, one antenna functions only as emitting device 4 and one antenna functions only as receiving device 5 during a measurement.

The data storage 8 is also used, here, for storing data via the individual response signals so that the evaluating device 7 can also evaluate the temporal sequence.

Figure 3:
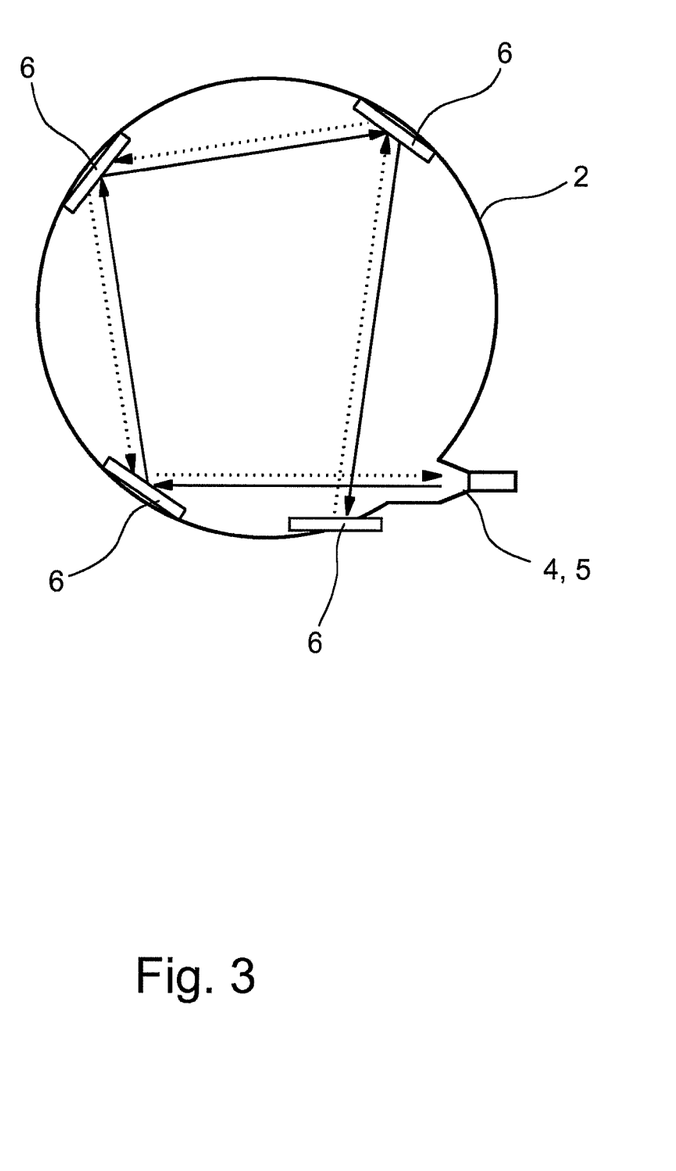
FIG. 3 is a top view through a further, alternative measuring arrangement.

In FIG. 3, an embodiment of the device 1 is schematically illustrated, with which electromagnetic signals are guided along the inner wall of the pipe 2 via a single emitting and receiving device 4, 5 in conjunction with four reflector devices 6.

The reflector devices 6, which, here in particular, are components of the pipe 2 or are inserted in the interior of the pipe 2, are designed for the special guiding of signals especially in respect to their reflection characteristics and are aligned relative to one another or to the emitting and receiving device 4, 5. In one variation, the reflector device 6 is also movable, so that the signal path can be changed.

In this case, the vortex generator—not shown—is also preferably designed so that the vortex in the medium to be measured is generated, preferably, near the perimeter of the pipe 2.

The antenna, which is used here as the emitting and receiving device 4, 5, is also designed as a part of the wall of the pipe or is joined onto it.

Alternatively, dielectric windows—not shown here—are inserted in the wall of the pipe 2. The windows are implemented, in the ideal case, in that a bundled antenna beam with a known directional characteristic is generated within the flowing medium. Thereby, the windows in the antenna beam are positioned so that multiple reflections do not overlap, if possible, with the main reflection and a large as possible signal to noise distance is achieved for the reference reflection.

Elimination of the input reflection can, for example, be carried out with a polarization discrimination as is described in German Patent Application DE 10 2011 102 991 and corresponding U.S. Pat. No. 8,958,068 B2.

What is claimed is:

1. A method for determining at least one velocity of a flowing, at least partially gaseous medium, comprising the steps of:
    generating-at least one vortex in the medium,
    emitting several electromagnetic signals into the medium essentially perpendicular to a direction of flow of the medium as query signals,
    receiving several electromagnetic signals as response signals,
    determining phases of the response signals in relation to the query signals,
    determining a measure of permittivity of the medium at least from the phases, and
    determining the velocity of the medium from the determined measure,
    wherein the query signals are emitted temporally shifted and
    wherein a temporal development of the phases is determined from the response signals.

2. The method according to claim 1, wherein at least one standard deviation of the phases is determined.

3. The method according to claim 1, wherein the query signals are emitted in different spatial directions, wherein the response signals are received from different spatial directions and wherein the response signals are cross-correlated with one another.

4. The method according to claim 1, wherein a marking gas is added to the medium.

5. A device for determining at least the velocity of an at least partially gaseous medium flowing through a pipe, comprising:
    at least one vortex generator adapted for generating at least one vortex in the medium,
    at least one emitting device adapted for emitting electromagnetic signals into a volume of a pipe conveying the medium as query signals,
    at least one receiving device adapted for receiving electromagnetic signals from the volume of the pipe conveying the medium as response signals,
    at least one evaluating device adapted for evaluating the response signals,
    at least one data storage adapted for storing at least one functional correlations, value tables, formulas, algorithms and mathematical models, and
    wherein the evaluating device is configured for determining at least the phase of the response signals in relation to the query signal and for determining the velocity of the medium based on at least phase determined and based on at least one piece of information stored in the data storage,
    wherein that at least one emitting device is adapted for emitting the query signals temporally shifted and
    wherein the evaluating device is configured for determining a temporal development of the phases from the response signals.

6. The device according to claim 5, wherein at least one reflector device is provided, wherein the emitting device is positioned so as to emit the query signal toward at least one the reflector device and wherein the receiving device is positioned so as to receive the response signal from the reflector device.

7. The device according to claim 5, wherein the evaluating unit is adapted for determining the time between emission of the query signals and receiving of the response signals.

8. The device according to claim 5, wherein the evaluating unit is adapted for determining a standard deviation of the determined phases and wherein the evaluating unit is adapted for determining the velocity of the medium based on the determined standard deviation and based on at least one piece of information stored in the data storage in relation to the standard deviation.

9. The device according to claim 5, wherein the at least one emitting device comprises at least two emitting devices and wherein the at least one receiving device comprises at least two receiving devices and wherein the at least one reflector device comprises at least two reflector devices and wherein at least one of the at least two emitting devices and at least one of the at two receiving device and one of the at least two reflector devices are movably designed.

* * * * *